US011714634B2

(12) United States Patent
Rakhimov

(10) Patent No.: US 11,714,634 B2
(45) Date of Patent: *Aug. 1, 2023

(54) SYSTEMS AND METHODS FOR PUSHING FIRMWARE BINARIES USING NESTED MULTI-THREADER OPERATIONS

(71) Applicant: Bank of Montreal, Toronto (CA)

(72) Inventor: Rinat Rakhimov, Toronto (CA)

(73) Assignee: BANK OF MONTREAL, Toronto (CA)

(*) Notice: Subject to any disclaimer, the term of this patent is extended or adjusted under 35 U.S.C. 154(b) by 62 days.

This patent is subject to a terminal disclaimer.

(21) Appl. No.: 17/378,545

(22) Filed: Jul. 16, 2021

(65) Prior Publication Data

US 2021/0342141 A1 Nov. 4, 2021

Related U.S. Application Data

(63) Continuation of application No. 16/736,687, filed on Jan. 7, 2020, now Pat. No. 11,068,256.

(Continued)

(51) Int. Cl.
*G06F 15/177* (2006.01)
*G06F 9/445* (2018.01)
(Continued)

(52) U.S. Cl.
CPC ............ *G06F 8/656* (2018.02); *G06F 9/4843* (2013.01); *G06F 16/128* (2019.01); *G06F 16/953* (2019.01); *H04L 63/0815* (2013.01)

(58) Field of Classification Search
CPC ...... G06F 8/656; G06F 16/953; G06F 16/128; G06F 9/4843; G06F 16/972; G06F 8/65; H04L 63/0815; H04L 67/34
See application file for complete search history.

(56) References Cited

U.S. PATENT DOCUMENTS 7,844,768 B2 * 11/2010 Tanaka ................. H05K 7/1459
710/301
9,690,569 B1 6/2017 Yeh
(Continued)

FOREIGN PATENT DOCUMENTS

CN 107885507 A 4/2018

OTHER PUBLICATIONS

Cisco Systems, Cisco UCS B200 M5 Blade Server Installation and Service Note, 98 pages (Year: 2017).*

(Continued)

*Primary Examiner* — Thuy Dao
(74) *Attorney, Agent, or Firm* — Foley & Lardner LLP

(57) ABSTRACT

A computer may receive a request to generate a snapshot view of the enterprise network infrastructure. The computer may implement a multithread process to contemporaneously query a plurality of blade servers and server enclosures within the entire network infrastructure. The computer may contemporaneously receive a plurality of information files from the queried network resources (e.g. the blade servers, server enclosures). In active state modes, the computer may push firmware update binaries to the network resources. In a server processing and an active state mode, the computer may implement a multithreaded process to push the firmware update binaries to standalone servers or blade servers that can be accessed directly. In a blade enclosure processing and an active state mode, the computer may implemented a nested multi-threader, using child threads nested within a parent thread to a blade server enclosure to push firmware update binaries to blade servers in the enclosure.

20 Claims, 11 Drawing Sheets

Related U.S. Application Data

(60) Provisional application No. 62/789,845, filed on Jan. 8, 2019.

(51) Int. Cl.
*H04L 12/26* (2006.01)
*G06F 9/455* (2018.01)
*G06F 8/656* (2018.01)
*G06F 9/48* (2006.01)
*H04L 9/40* (2022.01)
*G06F 16/953* (2019.01)
*G06F 16/11* (2019.01)

(56) References Cited

U.S. PATENT DOCUMENTS

| | | |
|---|---|---|
| 9,705,744 B2 * | 7/2017 | Geiger ................ H04L 43/0817 |
| 2018/0359144 A1 | 12/2018 | Malaspina et al. |
| 2019/0171436 A1 | 6/2019 | Shivanna et al. |

OTHER PUBLICATIONS

Chang et al., Protection and Control System Upgrade Based on IEC-61850 and PRP, IEEE, 2014 (22 pages).

* cited by examiner

900
FIG. 9

SYSTEMS AND METHODS FOR PUSHING FIRMWARE BINARIES USING NESTED MULTI-THREADER OPERATIONS

CROSS REFERENCE TO RELATED APPLICATIONS

The present application is a continuation of U.S. Ser. No. 16/736,687, entitled "SYSTEMS AND METHODS FOR PUSHING FIRMWARE BINARIES USING NESTED MULTI-THREADER OPERATIONS," filed Jan. 7, 2020, which claims benefit of U.S. Provisional Patent Application No. 62/789,845, filed Jan. 8, 2019, the entire contents of which are hereby incorporated by reference.

TECHNICAL FIELD

This application relates generally to systems and methods for maintaining and monitoring network infrastructures and more particularly to a tool that uses nested multi-threaded operations for pushing firmware binaries to remote servers.

BACKGROUND

Enterprise network infrastructures are quite complex containing interconnected but geographically distributed network computers and other network resources. For example, a modern day enterprise may have multiple datacenters and/or server farms. Furthermore, a single server farm or a datacenter may contain several servers and several other computing resources. In the server farms and datacenters, blade server technology has allowed enterprises to configure several servers within a single enclosure—further increasing the complexity of a typical enterprise network infrastructure. Monitoring and managing a complex enterprise network infrastructure becomes a complex operation in itself.

The conventional solutions for monitoring and managing a complex enterprise network infrastructure have several technical shortcomings. For example, a conventional solution queries vendor maintained database to retrieve the operating status of respective network resources. However, due to a sophisticated nature of enterprise scale networks that may include multiple geographically dispersed sites, firewalls and other infrastructure entities, the vendor maintained database and respective web front application servers may represent an additional layer of complexity themselves. In such complex environments these databases also may not be fully updated in real time and may contain incomplete and/or old data thereby not presenting the current state of network resources. Furthermore, these databases are prone to errors, wherein the errors may be introduced during the write cycles or due to the programming bugs. Also, the database may not be available to receive queries all the time, thereby reducing a system administrator's ability to efficiently monitor and manage an enterprise network infrastructure.

Additionally, the conventional solutions do not provide an integrated snapshot view containing the relevant information needed by a system administrator. The vendor maintained database, apart from not being contemporaneous and error-free, may not store all the relevant information. The information pieces received from other devices and databases may be scattershot and the system administrator may have to manually sift through the received information to retrieve relevant information.

Conventional systems are also confined to the passive functionality of collecting the scattershot information. Conventional systems do not provide an active functionality of pushing updates to remote servers while gathering the hardware information about the servers. These updates may have to be performed manually separate and apart from the information gathering and report generating functionality.

Furthermore, conventional systems require specialized software and hardware resources. For example, one has to install a webserver and a database server to continuously gather information from multiple network resources within a network infrastructure. Specialized software may be required to interface with the webserver or database server to generate and display results based on the gathered information. The conventional setup with additional hardware and software resources may be slow, inefficient, and bulky to maintain.

As such, a significant improvement is required for tools for maintaining complex network infrastructures.

SUMMARY

What is therefore desired are systems and methods that may enable an active mode of updating firmware of remote servers while generating an integrated report about the remote servers.

Embodiments disclosed herein attempt to provide solutions to the aforementioned problems and provide other solutions as well. A computer may receive a request to generate a snapshot view of the enterprise network infrastructure. The computer may implement a multi-threaded process to contemporaneously query a plurality of blade servers and server enclosures within the entire network infrastructure. The computer may contemporaneously receive a plurality of information files from the queried network resources (e.g. the blade servers, server enclosures). An information file for a network resource may contain information of the network resource such as the operating status, currency (also referred to as assembly date), hardware serial number, firmware version, and/or other information of the network resources. Integrating the information in the received files, the computer may generate snapshot view file. The snapshot view file may be in hypertext markup language (HTML) format. The computer may transmit a selectable link to the snapshot view file to multiple user devices. A user, such as a system administrator, may select the link and the respective user device may display the snapshot view in an application such as a web browser.

The computer may further enable an active state to push server firmware updates using nested multi-threaders while generating the snapshot view of the network. A nested multi-threader may include one or more child threads within a parent thread. For example, the computer may execute a first parent thread to access an on-board administrator module of a first server enclosure containing a first set of blade servers. The computer may then spawn a first set of child threads for the first set of blade servers to push firmware updates to each of the blade servers. Each child thread in the first set of child threads may be nested within the parent thread. Furthermore, the computer may execute a second parent thread to access an on-board administrator module of a second server enclosure containing a second set of blade servers. The computer may then spawn a second set of child threads for the second set of blade servers to push firmware updates to each of the blade servers. As with the first set of child threads, each child thread in the second set of child threads may be nested within the second parent thread.

In an embodiment, a computer-implemented method comprises during a first parent thread executed by a computer: querying, by the computer, a first on-board administration module of a first server enclosure using a first internet protocol address of the first server enclosure to retrieve a first set of data records containing hardware and firmware information of a first set of blade servers in the first server enclosure; spawning, by the computer, a first set of child threads corresponding to the first set of blade servers, wherein each child thread of the first set of child threads is nested within the first parent thread; pushing, by the computer, a firmware upgrade binary for at least a subset of the first set of blade servers using corresponding subset of child threads of the first set of child threads; during a second parent thread executed by the computer contemporaneously with the first parent thread: querying, by the computer, a second on-board administration module of a second server enclosure using a second internet protocol address of the second server enclosure to retrieve a second set of data records containing hardware and firmware information of a second set of blade servers in the second server enclosure; spawning, by the computer, a second set of child threads corresponding to the second set of blade servers, wherein each child thread of the second set of child threads is nested within the second parent thread; and pushing, by the computer, a firmware upgrade binary for at least a subset of the second set of blade servers using corresponding subset of child threads of the set of child threads.

In another embodiment, a system comprises a non-transitory storage medium storing a plurality of computer instructions forming a snapshot view engine; a processor electrically coupled to the non-transitory storage medium and configured to execute the plurality of computer instructions to: during a first parent thread executed by the processor: query a first on-board administration module of a first server enclosure using a first internet protocol address of the first server enclosure to retrieve a first set of data records containing hardware and firmware information of a first set of blade servers in the first server enclosure; spawn a first set of child threads corresponding to the first set of blade servers, wherein each child thread of the first set of child threads is nested within the first parent thread; push a firmware upgrade binary for at least a subset of the first set of blade servers using corresponding subset of child threads of the first set of child threads; during a second parent thread executed by the processor contemporaneously with the first parent thread: query a second on-board administration module of a second server enclosure using a second internet protocol address of the second server enclosure to retrieve a second set of data records containing hardware and firmware information of a second set of blade servers in the second server enclosure; spawn a second set of child threads corresponding to the second set of blade servers, wherein each child thread of the second set of child threads is nested within the second parent thread; and push a firmware upgrade binary for at least a subset of the second set of blade servers using corresponding subset of child threads of the set of child threads.

BRIEF DESCRIPTION OF THE DRAWINGS

The accompanying drawings constitute a part of this specification and illustrate embodiments of the subject matter disclosed herein.

FIG. 7 shows an illustrative graphical user interface (GUI) showing an illustrative snapshot view of a network architecture;

FIG. 8 shows an illustrative graphical user interface (GUI) showing an illustrative snapshot view of a network architecture; and FIG. 9 shows an illustrative graphical user interface (GUI) showing an illustrative snapshot view of a network architecture.

DETAILED DESCRIPTION

Figure 1:
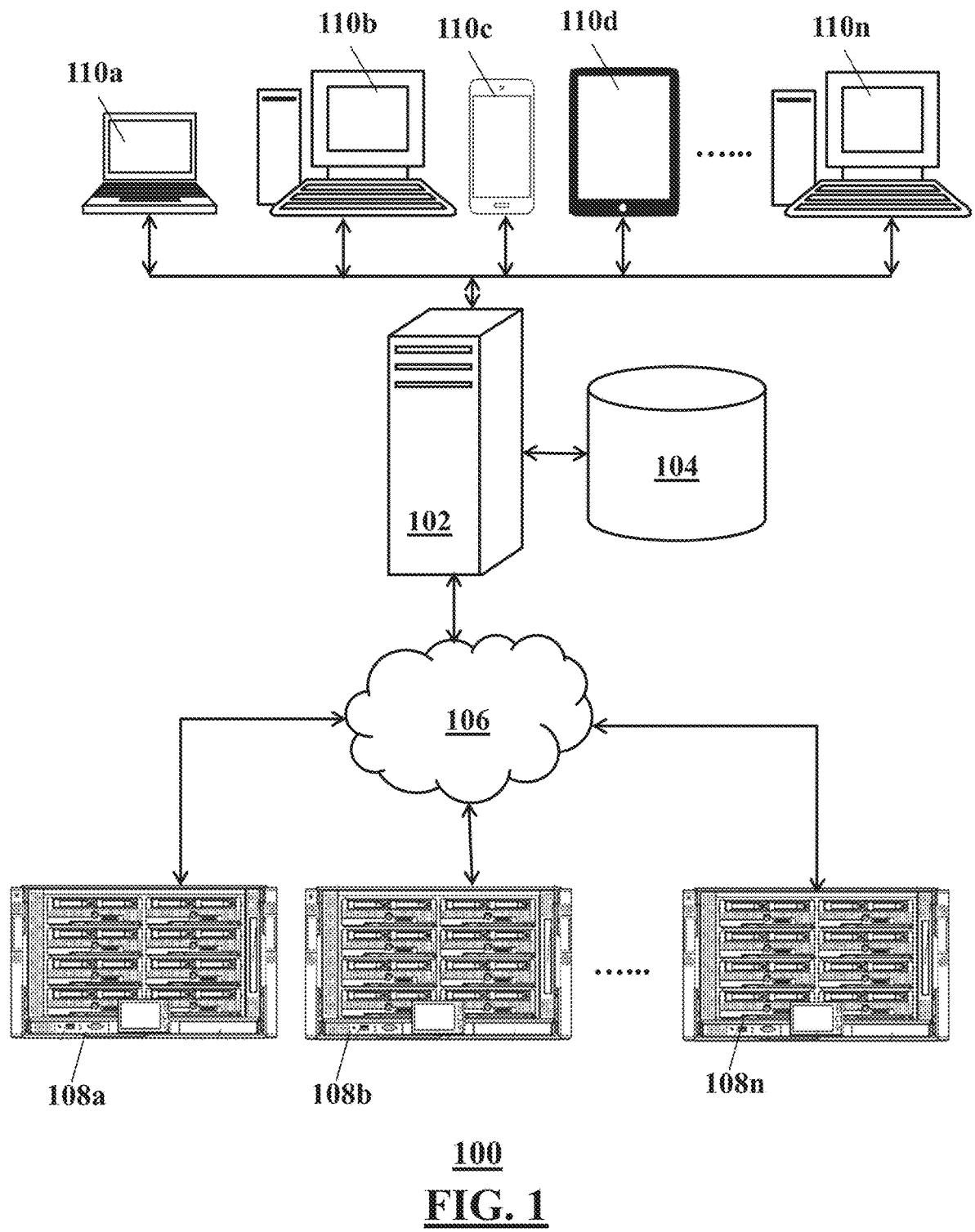
FIG. 1 shows an illustrative network environment in which a server generates a snapshot view of a network infrastructure.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein present a snapshot view of a network infrastructure using a one-click approach. The snapshot view can include hardware information (which may include firmware information) and status in the network infrastructure. Instead of executing complex protocols, a user, such as a system administrator, may launch a single copy of a snapshot view engine (also referred to as a snapshot engine) on a computer. In response, the computer may directly query the network resources in the network resources within the network infrastructure to retrieve hardware statistics, system state, and currency data (indicating the assembly date of a respective network resource). The method executed by the computer is therefore agentless because the method is based on a direct scan principle without using external databases, repositories, data collectors, or agents.

The computer may execute the snapshot view engine as a multi-threader. In other words, the computer may spin multiple threads of operations, with each thread of operation querying and retrieving information from a respective network resource contemporaneously with other threads. Using the multi-threaded approach, the computer may collect data from virtually unlimited number of network resources within a reasonable time-frame. The only limits imposed on the computer for such multi-threaded operation is hardware capability of the computer and the network resources and the throughput capability of the enterprise network infrastructure.

The snapshot view engine may rely upon RESTful API to upload the newly generated reports on a SharePoint site. There may be a retention mechanism allowing reports rotation on the SharePoint as per defined retention settings. At the same time, the snapshot view engine is capable of sending e-mail notifications to selected distribution lists. The notification may include a newly generated report URL as well as a link to a folder containing previous reports stored in accordance with the retention policies.

The snapshot view engine may operate in two scan modes. In a blade-enclosure infrastructure processing mode, the snapshot view engine may collect hardware and firmware data from blade enclosures and blade servers in the enclosures. For example, the snapshot view engine may connect with an on-board administrator of an enclosure to retrieve hardware data and firmware data about the blade servers in the enclosure. Alternatively, the snapshot view engine may connect to the blade servers through the on-board administrator to retrieve the hardware data and the firmware data. In a server processing mode, the snapshot view engine may retrieve hardware and firmware data from standalone servers and from the blade servers.

The snapshot view engine may be configured to be launched two operating states. In a passive operating state, the snapshot engine may collect hardware data and firmware data from blade servers or standalone servers. In an active operating state, the snapshot engine may push firmware updates to the blade servers or standalone servers. For standalone servers and blade servers that the snapshot view engine can access directly, the snapshot view engine may implement a multi-threader operation to push a firmware update to a standalone server or a blade server during a corresponding thread. For blade enclosures, the computer may implement a nested multi-threader operation.

A nested multi-threader operation may include one or more child threads within a parent thread. For example, the computer may execute a first parent thread to access an on-board administrator module of a first server enclosure containing a first set of blade servers. The computer may then spawn a first set of child threads for the first set of blade servers to push firmware updates to each of the blade servers. Each child thread in the first set of child threads may be nested within the parent thread. Furthermore, the computer may execute a second parent thread to access an on-board administrator module of a second server enclosure containing a second set of blade servers. The computer may then spawn a second set of child threads for the second set of blade servers to push firmware updates to each of the blade servers. As with the first set of child threads, each child thread in the second set of child threads may be nested within the second parent thread.

FIG. 1 shows an illustrative network environment 100, according to an exemplary embodiment. The snapshot view of a network infrastructure may be generated within the illustrative network environment 100. The network environment 100 may comprise an application server 102, a storage 104, network 106, a plurality of server enclosures 108a, 108b, . . . 108n (collectively or commonly referred to as 108), and a plurality of user devices 110a, 110b, 110c, 110d, . . . 110n (collectively or commonly referred to as 110). It should be understood that the illustrative network environment 100 is merely an example, and other network environments with additional, substitute, or lesser components should be considered to be within the scope of this disclosure.

The application server 102 may be any computing device comprising a processor and non-transitory machine-readable storage capable of executing the various tasks and processes described herein. The application server 102 may receive requests to generate a snapshot view from one or more of the client devices 110 or launch a respective task automatically within its own address space on a scheduled basis. Non-limiting examples of such computing devices may include workstation computers, laptop computers, server computers, and the like. While the illustrative network environment 100 includes a single application server 102, it should be appreciated that that in some embodiments the application server 102 may include any number of computing devices operating in a distributed computing environment.

The storage 104 may be any type of database containing files utilized for implementing one or more operations within the network environment 100. For example, the storage 104 may contain application binaries, log files, and/or any other type of files used by the application serve 102 implementing one or more operations. Although the illustrative network environment 100 shows the storage 104 apart from the application server 102, the storage 104 may be located within the application server 102 itself.

The network 106 may be any type of communication medium such as a local area network (LAN), metropolitan area network (MAN), and/or a wide area network (WAN). For instance, the network 106 may be the internet. The network 106 may be a combination of various wired and wireless links capable of carrying data packets in between the application server 102 and the server enclosures 108.

Each of the server enclosures 108 may contain a plurality of blade servers. Non-limiting examples of the server enclosures 108 and constituent blade servers may include HPE Bladesystem, Cisco Unified Computing System (UCS), IBM BladeCenter, Dell PowerEdge, and/or any other type of blade server enclosures and blade servers. Each server enclosure 108 may include a chassis for holding the constituent blade servers and further provide an integrated power management and cooling features. Within a server enclosure 108, an on-board administrator (OA) may module control the operation of the multiple blade servers. It should be understood that the server enclosures 108 are shown for illustrative purposes only and standalone servers should also be considered within the scope of this disclosure.

The user devices 110 can be any kind of computing devices. Non-limiting examples of user devices may include laptop computer 110a, desktop computers 110b, 110n, smartphone 110c, and tablet computer 110d. The user devices 110 may communicate with the application server to transmit a request to generate a snapshot view of a network infrastructure. Furthermore, the user devices 110 may receive a snapshot view file or a link to a snapshot view file and display a snapshot view.

Figure 2:
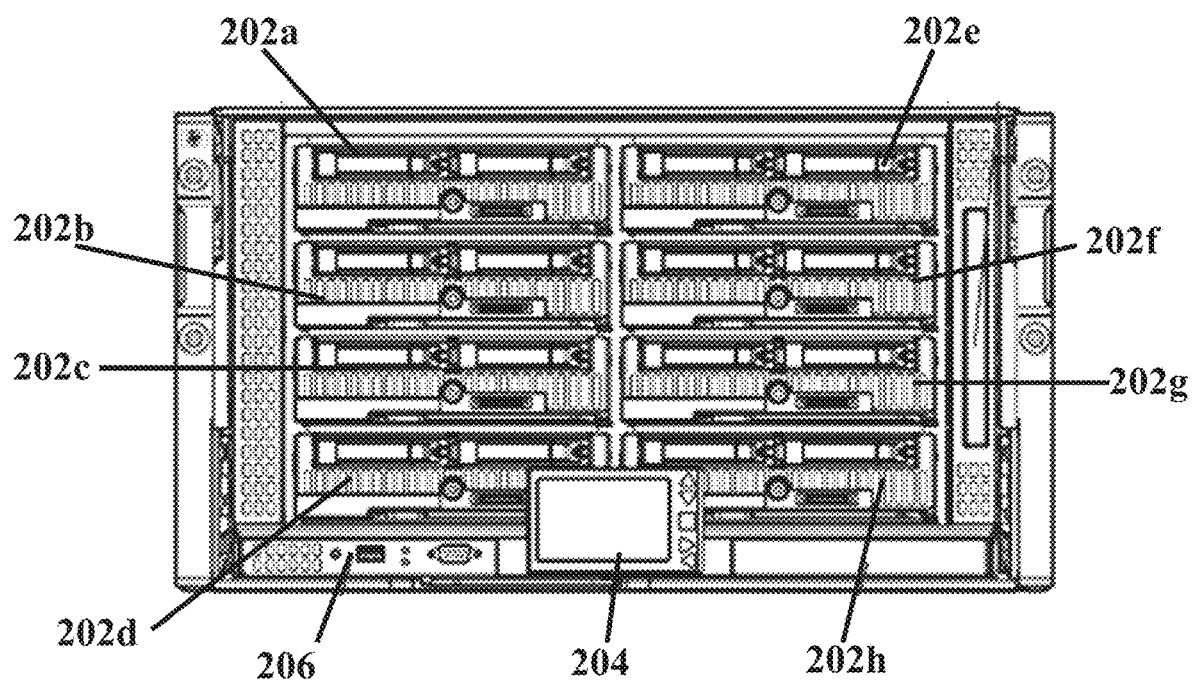
FIG. 2 shows an illustrative server enclosure with a plurality of illustrative blade servers.

FIG. 2 shows an illustrative server enclosure 200, according to an embodiment. The server enclosure 200 may include a plurality of blade servers 202a, 202b, 202c, 202d, 202e, 202f, 202g, 202h (collectively or commonly referred to as 202), a user interface 204, and a plurality of input/output ports 206. The server enclosure 200 may manage power and cooling to each of the blade servers 202. A system administrator or another user may use the input/output ports 206 to access the enclosure 200 or one or more blade servers 202 enclosed therein. The user interface 204 may allow the system administrator or another user to configure one or more features of the enclosure 200 or the one or more blade servers 202 contained therein. An on-board administrator module (not shown) running within the sever enclosure 200 may maintain various operations within the server enclosure.

Figure 3:
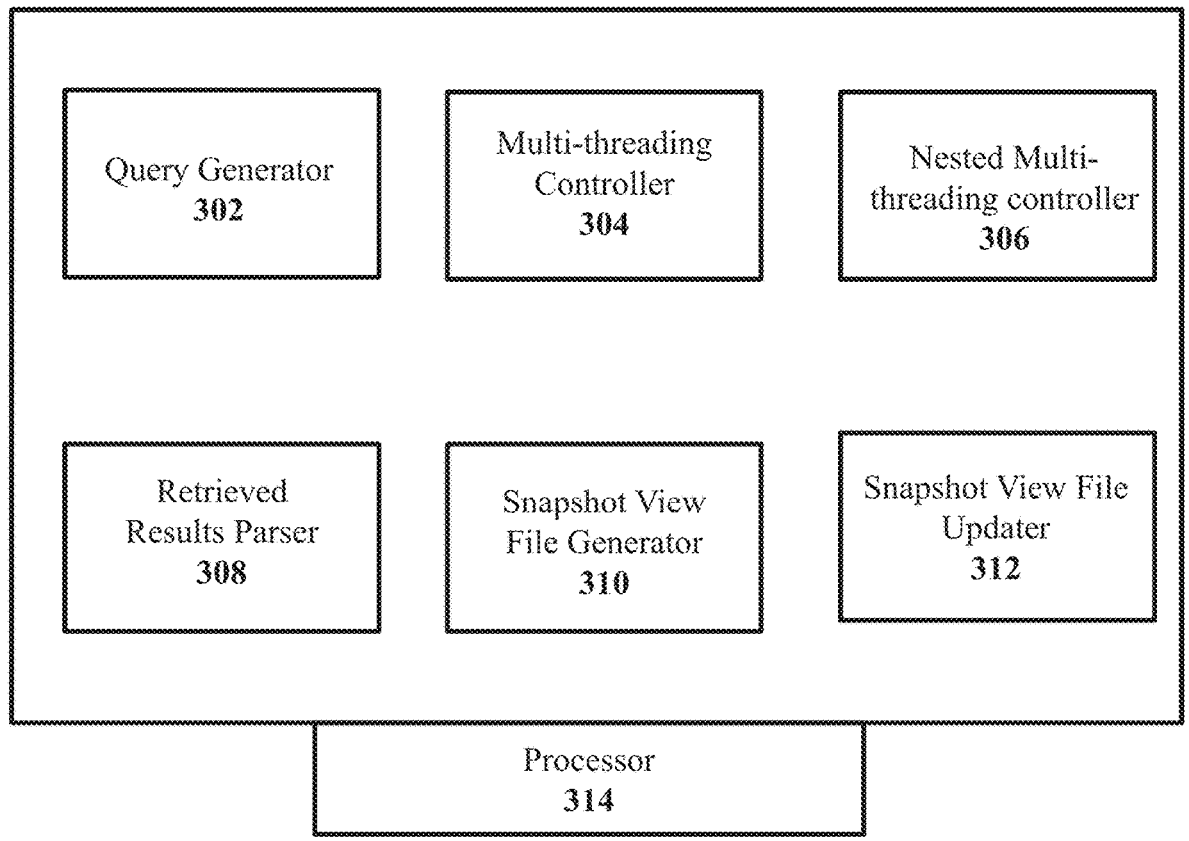
FIG. 3 shows illustrative software modules executed by a computer to generate a snapshot view of a network architecture.

FIG. 3 shows a block diagram showing illustrative software modules 300 implementing one or more processes described throughout this disclosure. A processor 314 may execute the software modules 300. The software modules 300 may include a query generator module 302, a multi-threading controller module 304, a nested multi-threading controller module 306, a retrieved results parser module 308, a snapshot view file generator module 310, and a snapshot view file updater module 312.

The query generator module 302 may generate queries to a plurality of network resources, such as blade servers and server enclosures, based on a request to generate a snapshot view of a network infrastructure formed by the network resources. The query generator module 302 may customize query based on the firmware of a respective network resource, based upon the application programming interface (API) of the respective network resource. For example, the query generator module 302 may generate a first query for a server enclosure and a second query, different from the first, for a blade server.

The multi-threading controller module 304 may manage and control the multi-threading operation of the software modules 300. For instance, the multi-threading controller module 302 may spawn a first thread for a first query and/or push firmware upgrades to a first network resource and a second thread for a second query and/or push firmware upgrades to a second network resource. Furthermore, under the control of the multi-threading controller 304, the first thread may execute a first listener for any response data from the first network resource and the second thread may execute a second listener for any response data from the second network resource. It should be understood that the two threads described here are merely for illustration, and the multi-threading controller module 304 may implement hundreds of threads during a single launch of the software modules 300.

The nested multi-threading controller module 306 may manage and control the nested multi-threading operations of the software modules 300. Within a thread spawned by the multi-threading controller module 304, the nested multi-threading controller module 308 may generate nested child threads. For example, the multi-threading controller module 304 may spawn a first thread to query an on-board administrator module in a blade server enclosure, and the nested multi-threading controller module 306 may spawn a set of child threads nested within the first thread to push firmware upgrades to each blade server within the blade server enclosure.

The retrieved results parser module 308 may receive files from the queried network resources and parse the received files to extract relevant information. For example, the received files may be space delimited text containing information such as operation status, hardware serial number, assembly date, firmware version and date, and/or any other attributes of a respective network resource. The retrieved results parser module 308 may parse and extract the aforementioned and other information from the received files. Furthermore, multi-threading controller module 304 may execute multiple instances of the retrieved results parser module 308 such that multiple received files are parsed contemporaneously for a faster and more efficient operation.

The snapshot view file generator module 310 may integrate information extracted from each of the received files to generate a snapshot view file. In other words, the snapshot view file may contain information on a plurality of network resources. In some instances, the snapshot view file generator module 310 may generate the snapshot view file in hypertext markup language (HTML) format such that a user may open the snapshot view file using a web-browser.

The snapshot view file updater module 312 may update a snapshot view file based new queries from the query generator module 302 and new files received from the respective hardware resources. For example, a user may request a new snapshot view with updates to a subset of network resources in an existing snapshot view. The snapshot view file updater module 312 may invoke the query generator module 302 in association with the multi-threading controller module 304 to run queries on the requested subset of network resources to update the existing snapshot view. In some embodiments, the snapshot view file updater module 312 may run periodic queries on one or more network resources in an existing snapshot view based on the request from the user.

It should be understood that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 4A:
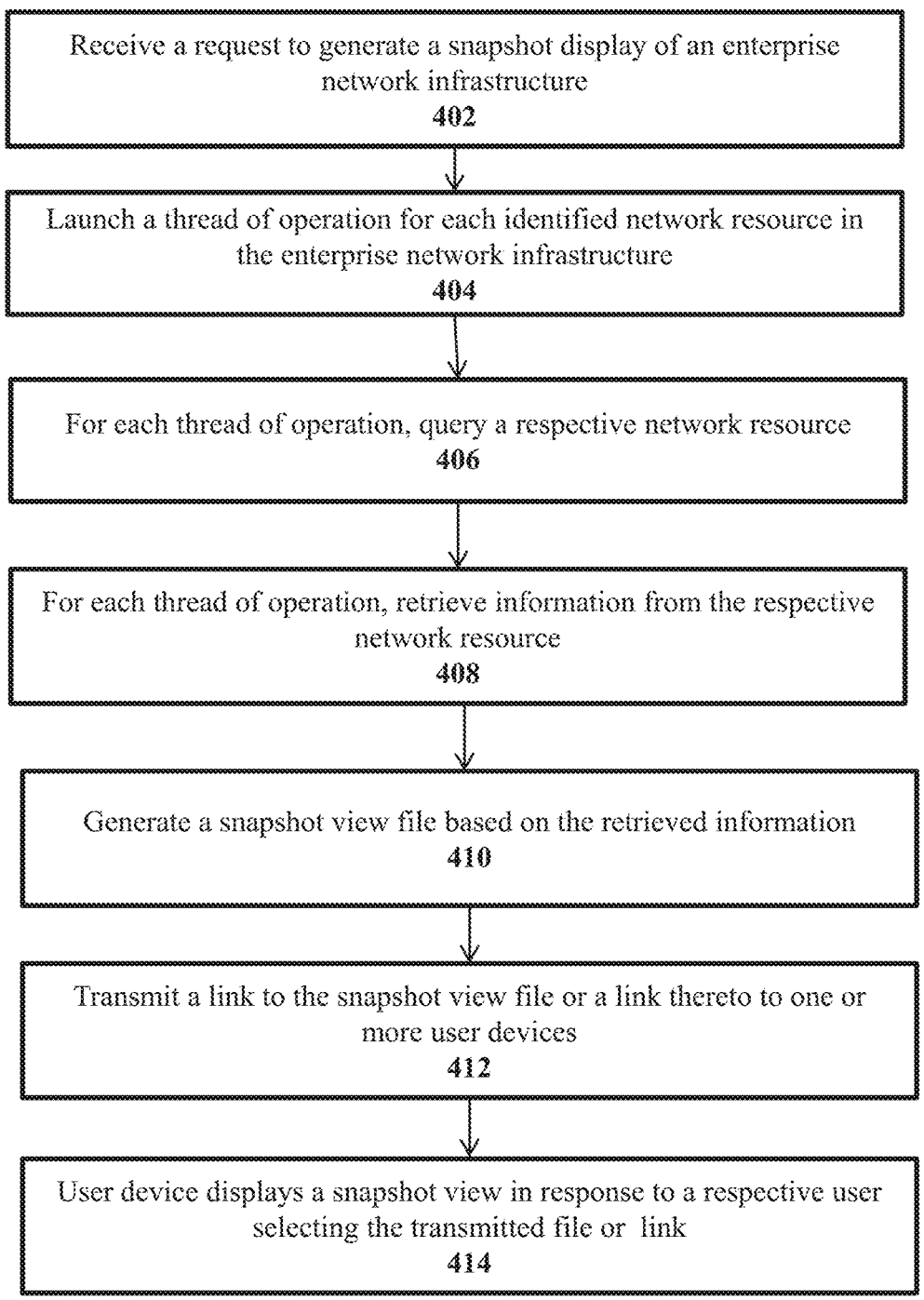
FIG. 4A shows an illustrative flow diagram of a method to generate a snapshot view of a network architecture.

FIG. 4A shows a flow diagram 400a of a method for generating a snapshot display, according to an illustrative embodiment. Although multiple computers may execute the steps of the method shown in the flow diagram 400a, this description details, for brevity, a computer executing the steps of the method. It should also be understood that the method steps described below are merely illustrative and additional, alternate, and/or lesser number of steps should be considered to be within the scope of this disclosure.

The method may begin at step 402, where the computer may receive a request to generate a snapshot display of an enterprise network architecture. In some instances, the request may be in the form of an executable binary file placed for automated runs in a computer. For example, if the computer is a Windows machine, a user (such as a system administrator) may place the executable binary file in the Task Scheduler for automated runs. In other instances, the user may manually launch the executable binary file from a command line interface (CLI) such as Windows Powershell, command line shell, Apple Commandshell, and Linux Bash. In yet other instances, the user may click on an icon displayed by the computer in a graphical user interface (GUI), and, the computer may execute the executable binary in response to receiving the click.

In addition to launching the executable binary file by any of the aforementioned actions, the user may also provide a list of internet protocol (IP) addresses for each of the network resource that the computer has to retrieve status information and other information. In other words, the list of IP addresses may identify network resources to be queried by the computer. Non-limiting examples of the network resource include blade servers, server enclosures, rack servers, routers, switches, and any other type of network device. The IP address is merely illustrative, and the user may provide other types of address used to access the respective network resource such as machine access code (MAC). The user may provide the list of IP address or any other type of address in a text file that the executable binary file may access. In some instances, the addresses may be hardcoded in the executable binary file itself. In other instances, the computer may receive the addresses during the runtime of the executable binary file. The aforementioned techniques of the computer receiving the list of IP addresses or any other type of addresses are merely illustrative and other techniques should be considered within the scope of this disclosure.

In step 404, the computer may launch a thread of operation for each identified network resource. In other words, the executable binary file may be configured as a multi-threader capable of collecting data from multiple network resources simultaneously. For each thread of operation, the computer may query a respective network resource for status and other information and retrieve the queried information. Using the multi-threaded application, the computer may contemporaneously pipe in data from multiple network resources to ensure that there are updates in a reasonable amount of time.

In step 406, the computer may query a respective network resource for each thread of operation. The query may be a direct query, with the computer querying the bios or firmware of the network resource directly as opposed to the conventional systems that query a third party database. Each query may be based upon the request received in step 402. For example, a first request may be for a first set of attributes and a second request may be for a second set of attributes, and the corresponding queries in step 406 may be for the first and second set of attributes, respectively. In addition to a query, the computer may also transmit the respective login credentials to the network resources for the network resources to authenticate the computer and accept the query. The login credentials may have been provided by or setup in conjunction with a respective vendor of each network resource. In some embodiments, the computer may store the login credentials in a database such that the user may not have to provide login credentials for subsequent runs. The login credentials may include, for example, a username and password. The username and password may be associated with a single sign-on (SSO) mechanism, e.g., the computer may use the username and password to sign on to an universal on-board administrator thereby gaining access to all the network resources controlled by the universal on-board administrator.

In step 408, the computer may retrieve information from a respective network resource for each thread of operation. The network resource may transmit a file to the computer containing the information. For example, if the computer has executed 100 threads of operation to query 100 network resources in step 406, the computer may receive 100 files containing respective queried information. In some embodiments, the files may be text files containing requested information in a space delimited or comma delimited format. From the received files, the computer may parse and store the relevant information of the network resources merging them to a single report file available to the end user. The computer may then automatically delete the multiple received files from remote network resources.

In some embodiments, one or more network resources may be redundant. For instance, an enclosure may have two management modules for each of active and standby mode, wherein each mode may be associated with an IP address. The computer may first query IP address with the active mode and if the query times out, may query the IP address with the standby mode. Such query will provide a notification to the computer whether a failover has occurred in the enclosure.

In step 410, the computer may generate a snapshot view file based on the retrieved information. In some embodiments, the computer may generate the snapshot view file in a hypertext markup language (HTML) format such that a user may access the snapshot file through a web-browser. The computer may integrate the retrieved the information and add HTML tags to generate the HTML file. The HTML file described herein is merely exemplary, and the computer may generate the snapshot view file in other computer readable format.

In step 412, the computer may transmit the snapshot view file or a link thereto to one or more user devices. In some embodiments, the computer may upload the snapshot view file to a SharePoint server and generate a link to the file. The computer may then transmit the link to the user devices by forms of communications such as e-mail, instant messaging or any other form of electronic communication. In other embodiments, the computer may transmit the snapshot view file itself to the user devices for the user devices to store the snapshot view file locally.

In step 414, a user device may display the snapshot view in response to a respective user selecting the transmitted file or link. For the snapshot view file in HTML format, a user can select a link to the file or select the file and the user device may display the snapshot view in a web browser such as Internet Explorer, Mozilla Firefox, Google Chrome, and/or Safari. In other words, the user device does not require a specialized application for the snapshot view and use an existing web browser.

Figure 4B:
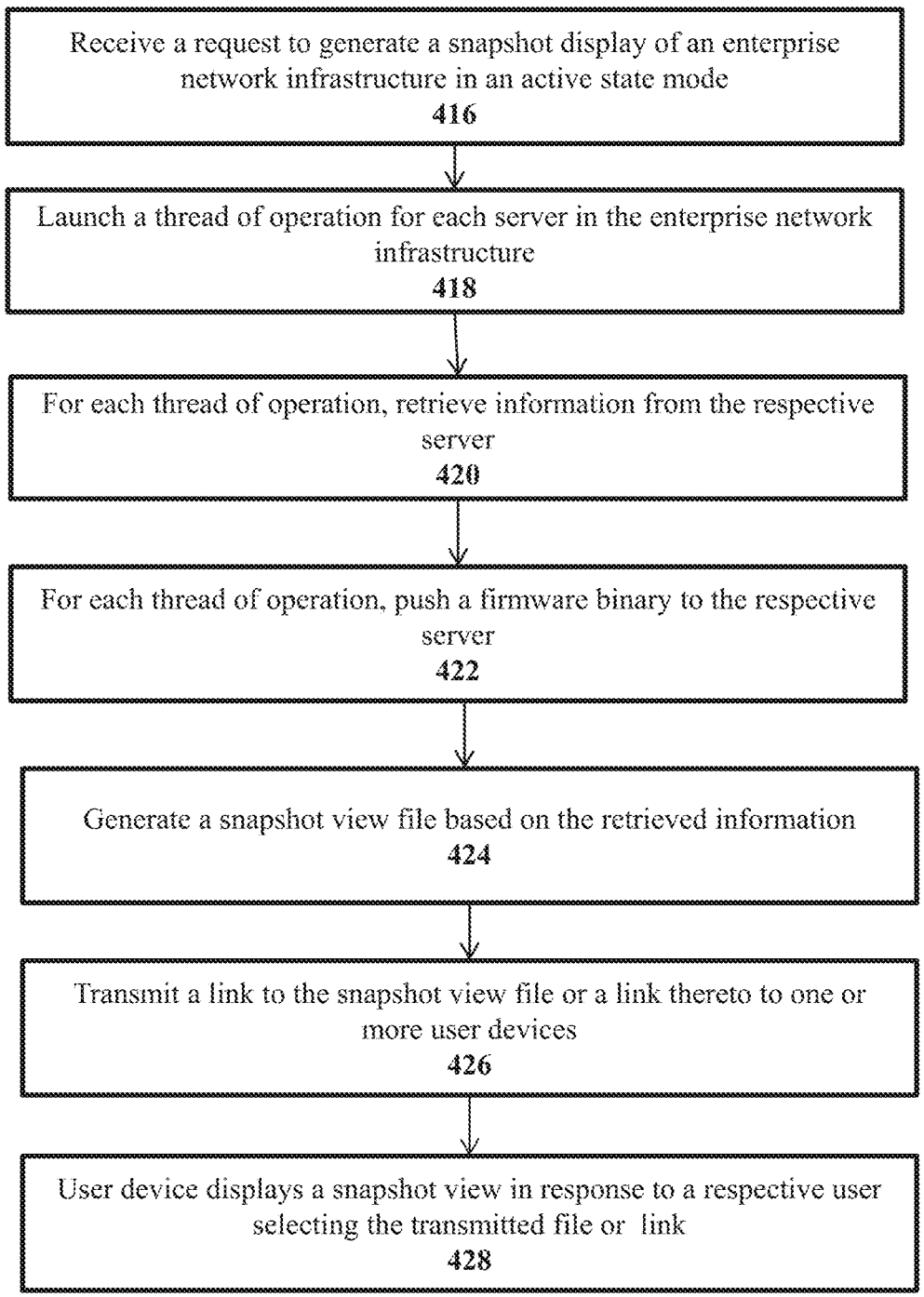
FIG. 4B shows an illustrative flow diagram of a method to generate a snapshot view of a network architecture in a server processing and an active state mode.

FIG. 4B shows a flow diagram 400b of a method for generating a snapshot display in a server processing and active state mode, according to an illustrative embodiment. Although multiple computers may execute the steps of the method shown in the flow diagram 400b, this description details, for brevity, a computer executing the steps of the method. It should also be understood that the method steps described below are merely illustrative and additional, alternate, and/or lesser number of steps should be considered to be within the scope of this disclosure. In a server processing mode, the computer may scan (e.g., query and retrieve information from) standalone servers and blade servers that can be scanned directly without going through an on-board administrator module.

The method may begin at step 416, where the computer may receive a request to generate a snapshot display of an enterprise network in an active state mode. In some instances, the request may be in the form of an executable binary file placed for automated runs in a computer. For example, if the computer is a Windows machine, a user (such as a system administrator) may place the executable binary file in the Task Scheduler for automated runs. In other instances, the user may manually launch the executable binary file from a command line interface (CLI) such as Windows Powershell, command line shell, Apple Commandshell, and Linux Bash. In yet other instances, the user may click on an icon displayed by the computer in a graphical user interface (GUI), and, the computer may execute the executable binary in response to receiving the click.

In addition to launching the executable binary file by any of the aforementioned actions, the user may also provide a list of internet protocol (IP) addresses for each of the servers that the computer has to retrieve status information and other information (also referred to as scan). The list of IP addresses may identify the servers to be queried by the computer. Non-limiting examples of the servers include blade servers, server enclosures, rack servers, routers, switches, and any other type of network device. The IP address is merely illustrative, and the user may provide other types of address used to access the respective network resource such as machine access code (MAC). The user may provide the list of IP address or any other type of address in a text file that the executable binary file may access. In some instances, the addresses may be hardcoded in the executable binary file itself. In other instances, the computer may receive the addresses during the runtime of the executable binary file. The aforementioned techniques of the computer receiving the list of IP addresses or any other type of addresses are merely illustrative and other techniques should be considered within the scope of this disclosure.

Being in the active state mode, the computer may also retrieve one or more firmware binary files to be pushed to the servers that are scanned by the computer. In some instances, the firmware binary files may be stored locally within the computer. In other instances, the firmware binary files may be stored remotely that the computer has to access using one or more remote file access/transfer protocols. The user may provide the addresses of the one or more firmware binary files to the executable binary file. The addresses may in the aforementioned text file that the executable binary file may access. In some instances, the addresses may be hardcoded within the executable binary file itself. It should be understood that these techniques of accessing the addresses of the firmware binary files are merely illustrative and other techniques should be considered within the scope of this disclosure.

In step 418, the computer may launch a thread of operation for each identified server. The executable binary file may be therefore configured as a multi-threader capable of collecting data from multiple servers simultaneously. For each thread of operation, the computer may query a respective server for status and other information and retrieve the queried information (also referred to as scanning). Using the multi-threaded application, the computer may contemporaneously pipe in data from multiple servers to ensure that there are updates in a reasonable amount of time.

In step 420, the computer may retrieve information from a respective server for each thread of operation. To retrieve the information, the computer may formulate a query for the respective server. The query may be a direct query, with the computer querying the bios or firmware of the server directly as opposed to the conventional systems that query a third party database. Each query may be based upon the request received in step 416. For example, a first request may be for a first set of attributes and a second request may be for a second set of attributes, and the corresponding queries may be for the first and second set of attributes, respectively. In addition to the query, the computer may also transmit the respective login credentials to the servers for the servers to authenticate the computer and accept the query. The login credentials may have been provided by or setup in conjunction with a respective vendor of each server. In some embodiments, the computer may store the login credentials in a database such that the user may not have to provide login credentials for subsequent runs. The login credentials may include, for example, a username and password.

In response to the query, the computer may retrieve information from a respective server for each thread of operation. The server may transmit a file to the computer containing the information. For example, if the computer has executed 100 threads of operation to query 100 servers, the computer may receive 100 files containing respective queried information. In some embodiments, the files may be text files containing requested information in a space delimited or comma delimited format. From the received files, the computer may parse and store the relevant information of the servers merging them to a single report file available to the end user. The computer may then automatically delete the multiple received files from the servers.

In step 422, the computer may push a firmware binary to respective server for each thread of operation. The computer may determine if the one or more firmware binary files are compatible with one or more servers. If a firmware binary file is compatible with a server and the computer has permission to upgrade the firmware of the server, the computer the corresponding firmware binary file to the server. The functionality of pushing the firmware binary file to the respective server enables snapshot display generation process to be active collecting data and pushing firmware upgrades at the same time.

In step 424, the computer may generate a snapshot view file based on the retrieved information. In some embodiments, the computer may generate the snapshot view file in a hypertext markup language (HTML) format such that a user may access the snapshot file through a web-browser. The computer may integrate the retrieved the information and add HTML tags to generate the HTML file. The HTML file described herein is merely exemplary, and the computer may generate the snapshot view file in other computer readable format.

In step 426, the computer may transmit the snapshot view file or a link thereto to one or more user devices. In some embodiments, the computer may upload the snapshot view file to a SharePoint server and generate a link to the file. The computer may then transmit the link to the user devices by forms of communications such as e-mail, instant messaging or any other form of electronic communication. In other embodiments, the computer may transmit the snapshot view file itself to the user devices for the user devices to store the snapshot view file locally.

In step 428, a user device may display the snapshot view in response to a respective user selecting the transmitted file or link. For the snapshot view file in HTML format, a user can select a link to the file or select the file and the user device may display the snapshot view in a web browser such as Internet Explorer, Mozilla Firefox, Google Chrome, and/or Safari. The user device therefore may not require a specialized application for the snapshot view and use an existing web browser.

Figure 4C:
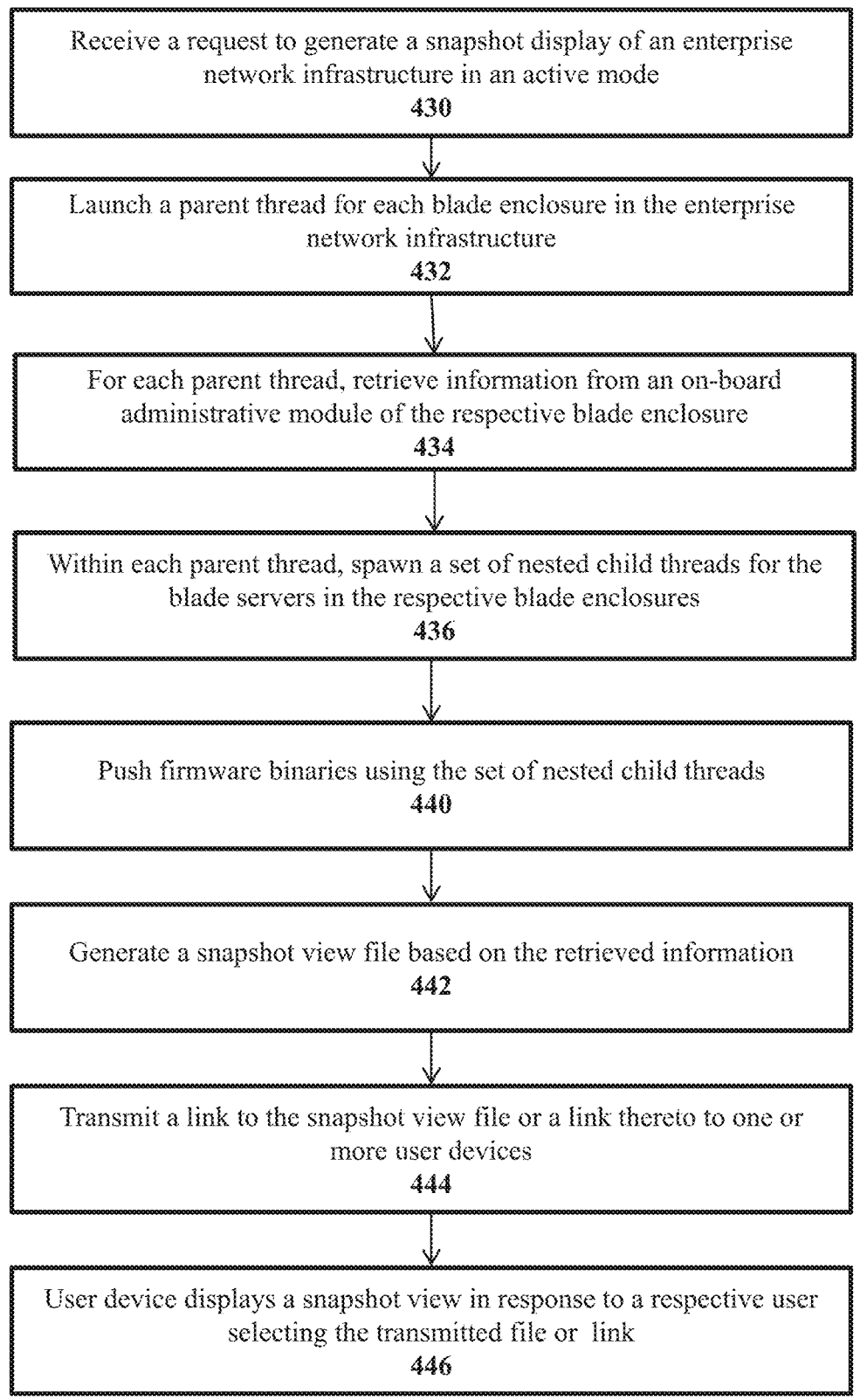
FIG. 4C shows an illustrative flow diagram of a method to generate a snapshot view of a network architecture in a blade enclosure processing and an active state mode.

FIG. 4C shows a flow diagram 400c of a method for generating a snapshot display in a blade enclosure processing and active state mode, according to an illustrative embodiment. Although multiple computers may execute the steps of the method shown in the flow diagram 400c, this description details, for brevity, a computer executing the steps of the method. It should also be understood that the method steps described below are merely illustrative and additional, alternate, and/or lesser number of steps should be considered to be within the scope of this disclosure. In a blade enclosure processing mode, the computer may scan (e.g., query and retrieve information from) blade enclosure containing a plurality of blade servers and also push firmware binaries to the blade servers using nested multi-threader operations.

The method may begin at step 430, where the computer may receive a request to generate a snapshot display of an enterprise network in an active state mode. In some instances, the request may be in the form of an executable binary file placed for automated runs in a computer. For example, if the computer is a Windows machine, a user (such as a system administrator) may place the executable binary file in the Task Scheduler for automated runs. In other instances, the user may manually launch the executable binary file from a command line interface (CLI) such as Windows Powershell, command line shell, Apple Commandshell, and Linux Bash. In yet other instances, the user may click on an icon displayed by the computer in a graphical user interface (GUI), and, the computer may execute the executable binary in response to receiving the click.

In addition to launching the executable binary file by any of the aforementioned actions, the user may also provide a list of internet protocol (IP) addresses for each of the on-board administrator modules that the computer has to retrieve status information and other information (also referred to as scan). The list of IP addresses may identify the on-board administrator modules to be queried by the computer. The IP address is merely illustrative, and the user may provide other types of address used to access the respective on-board administrator module such as machine access code (MAC). The user may provide the list of IP address or any other type of address in a text file that the executable binary file may access. In some instances, the addresses may be hardcoded in the executable binary file itself. In other instances, the computer may receive the addresses during the runtime of the executable binary file. The aforementioned techniques of the computer receiving the list of IP addresses or any other type of addresses are merely illustrative and other techniques should be considered within the scope of this disclosure.

Being in the active state mode, the computer may also retrieve one or more firmware binary files to be pushed to the blade servers associated with the on-board administrator modules that are scanned by the computer. In some instances, the firmware binary files may be stored locally within the computer. In other instances, the firmware binary files may be stored remotely that the computer has to access using one or more remote file access/transfer protocols. The user may provide the addresses of the one or more firmware binary files to the executable binary file. The addresses may in the aforementioned text file that the executable binary file may access. In some instances, the addresses may be hardcoded within the executable binary file itself. It should be understood that these techniques of accessing the addresses of the firmware binary files are merely illustrative and other techniques should be considered within the scope of this disclosure.

In step 432, the computer may launch a parent thread of operation (also referred to as parent thread) for each identified on-board administrator module. The executable binary file may be therefore configured as a multi-threader capable of collecting data from multiple administrator modules simultaneously. For each thread of operation, the computer may query a respective on-board administrator module for status and other information for each of the blade servers associated with the on-board administrator module and retrieve the queried information (also referred to as scanning). Using the multi-threaded application, the computer may contemporaneously pipe in data from multiple blade enclosures to ensure that there are updates in a reasonable amount of time.

In step 434, the computer may retrieve information from a respective on-board administrator module for each parent thread. To retrieve the information, the computer may formulate a query for the respective on-board administrator module. The query may be a direct query, with the computer querying the bios or firmware of the on-board administrator module directly as opposed to the conventional systems that query a third party database. Each query may be based upon the request received in step 430. For example, a first request may be for a first set of attributes and a second request may be for a second set of attributes, and the corresponding queries may be for the first and second set of attributes, respectively. In addition to the query, the computer may also transmit the respective login credentials to the on-board administrator modules for the on-board administrator modules to authenticate the computer and accept the query. The login credentials may have been provided by or setup in conjunction with a respective vendor of each server. In some embodiments, the computer may store the login credentials in a database such that the user may not have to provide login credentials for subsequent runs. The login credentials may include, for example, a username and password. The username and password may be associated with a single sign-on (SSO) mechanism, e.g., the computer may use the username and password to sign on to an on-board administrator module thereby gaining access to all the blade servers controlled by the on-board administrator.

In response to the query, the computer may retrieve information from a respective on-board administrator module for each parent thread. The on-board administrator may transmit a file to the computer containing the information. For example, if the computer has executed 100 threads of operation to query 100 on-board administrator modules, the computer may receive 100 files containing respective queried information. In some embodiments, the files may be text files containing requested information in a space delimited or comma delimited format. From the received files, the computer may parse and store the relevant information of the on-board administrator modules merging them to a single report file available to the end user. The computer may then automatically delete the multiple received files from the on-board administrator modules.

In step 436, the computer may spawn a nested child threads within each parent thread. As described above, the computer may use a parent thread to scan an on-board administrator module of a blade server enclosure. The blade server enclosure may include a plurality of blade servers and the computer may spawn child threads for each blade servers. Within the parent thread, the computer may execute the child threads concurrently. The child threads therefore may be nested within the parent thread.

In step 440, the computer may push a firmware binary to respective blade server during each child thread. The computer may determine if the one or more firmware binary files are compatible with one or more blade servers. If a firmware binary file is compatible with a blade server and the computer has permission to upgrade the firmware of the blade server, the computer the corresponding firmware binary file to the blade server. The functionality of pushing the firmware binary file to the respective blade server enables snapshot display generation process to be active collecting data and pushing firmware upgrades at the same time. Furthermore, the nested multi-threader enables the firmware upgrades to be performed quickly and efficiently.

In step 442, the computer may generate a snapshot view file based on the retrieved information. In some embodiments, the computer may generate the snapshot view file in a hypertext markup language (HTML) format such that a user may access the snapshot file through a web-browser. The computer may integrate the retrieved the information and add HTML tags to generate the HTML file. The HTML file described herein is merely exemplary, and the computer may generate the snapshot view file in other computer readable format.

In step 444, the computer may transmit the snapshot view file or a link thereto to one or more user devices. In some embodiments, the computer may upload the snapshot view file to a SharePoint server and generate a link to the file. The computer may then transmit the link to the user devices by forms of communications such as e-mail, instant messaging or any other form of electronic communication. In other embodiments, the computer may transmit the snapshot view file itself to the user devices for the user devices to store the snapshot view file locally.

In step 446, a user device may display the snapshot view in response to a respective user selecting the transmitted file or link. For the snapshot view file in HTML format, a user can select a link to the file or select the file and the user device may display the snapshot view in a web browser such as Internet Explorer, Mozilla Firefox, Google Chrome, and/or Safari. The user device therefore may not require a specialized application for the snapshot view and use an existing web browser.

Figure 5:
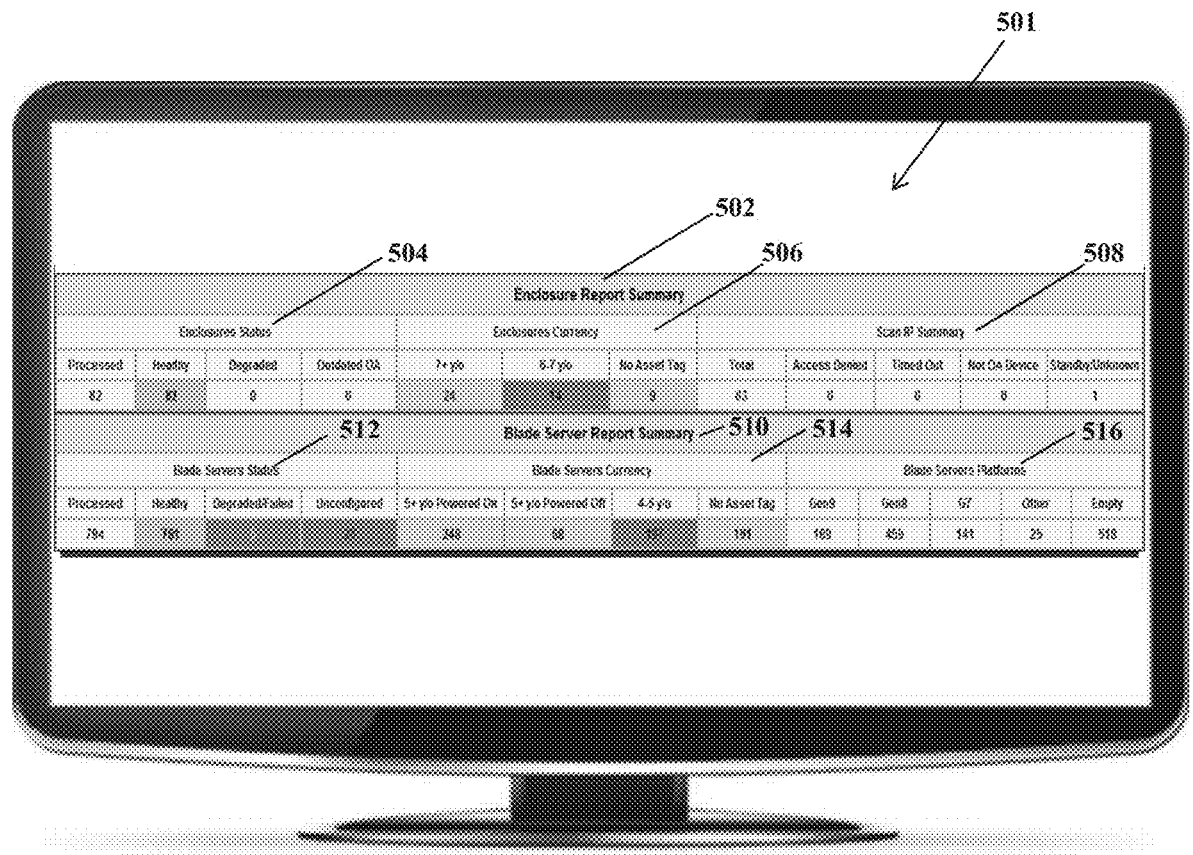
FIG. 5 shows an illustrative graphical user interface (GUI) showing an illustrative snapshot view of a network architecture.

FIG. 5 shows a graphical user interface (GUI) 500 with a first illustrative snapshot view 501 of network infrastructure. The snapshot view 501 may have been generated by a computer using the illustrative methods and illustrative principles described herein. The snapshot view 501, as shown herein, may display a summary of various network resources in the network infrastructure. For instance, the snapshot view 501 may display an enclosure report summary 502 of a remote enclosure within the network infrastructure. The enclosure report summary 502 may include enclosures status column 504 displaying the number of the enclosures that were processed for snapshot view 501. The enclosures status column 504 may further display, out of the processed enclosures, the number of healthy enclosures, the number of degraded enclosures, and/or the number of outdated on-board administrators. The enclosure report summary 502 may further include an enclosures currency tab 506 displaying the currency (age) of the enclosures. As an illustration, the currency tab 506 may display the number of enclosures that are more than seven years old, the number of enclosures that are six to seven years old, and/or the number of enclosures with no asset tags. The enclosure report summary 502 may further include a Scan IP summary column 508 displaying the summary of the internet protocol (IP) addresses that were scan by the computer. For instance, the scan IP summary 508 may display the total number of IP addresses that were scanned, the number of IP addresses that denied access to the computer, the number of IP addresses for which one or more requests by the computer were timed out, the number of IP addresses that were not associated with an on-board administrator (OA), and/or the number of IP addresses associated with unknown destination or devices. The snapshot view 501 may further display a blade server report summary 510. The blade server report summary 510 may display a blade servers status column 512 displaying the respective numbers of processed blade servers, healthy blade servers, degraded or failed blade servers, and/or unconfigured blade servers. The blade server report summary 510 may further display a blade servers currency column 514 displaying the currency statuses of the processed blade servers. As shown herein, the blade servers currency column 514 may include the respective numbers of powered on blade servers that are more than five years old, powered off blade servers that are more than five years old, blade servers that are four to five years old, and/or blade servers with no asset tag. The blade server report summary 510 may further include blade servers platforms column 516 displaying the respective numbers of blade servers associated with respective hardware platform. For example, a hardware platform may be the generation/version of the server hardware/software. The blade servers platform column 516 may further include the number of blade servers without platform information.

Figure 6:
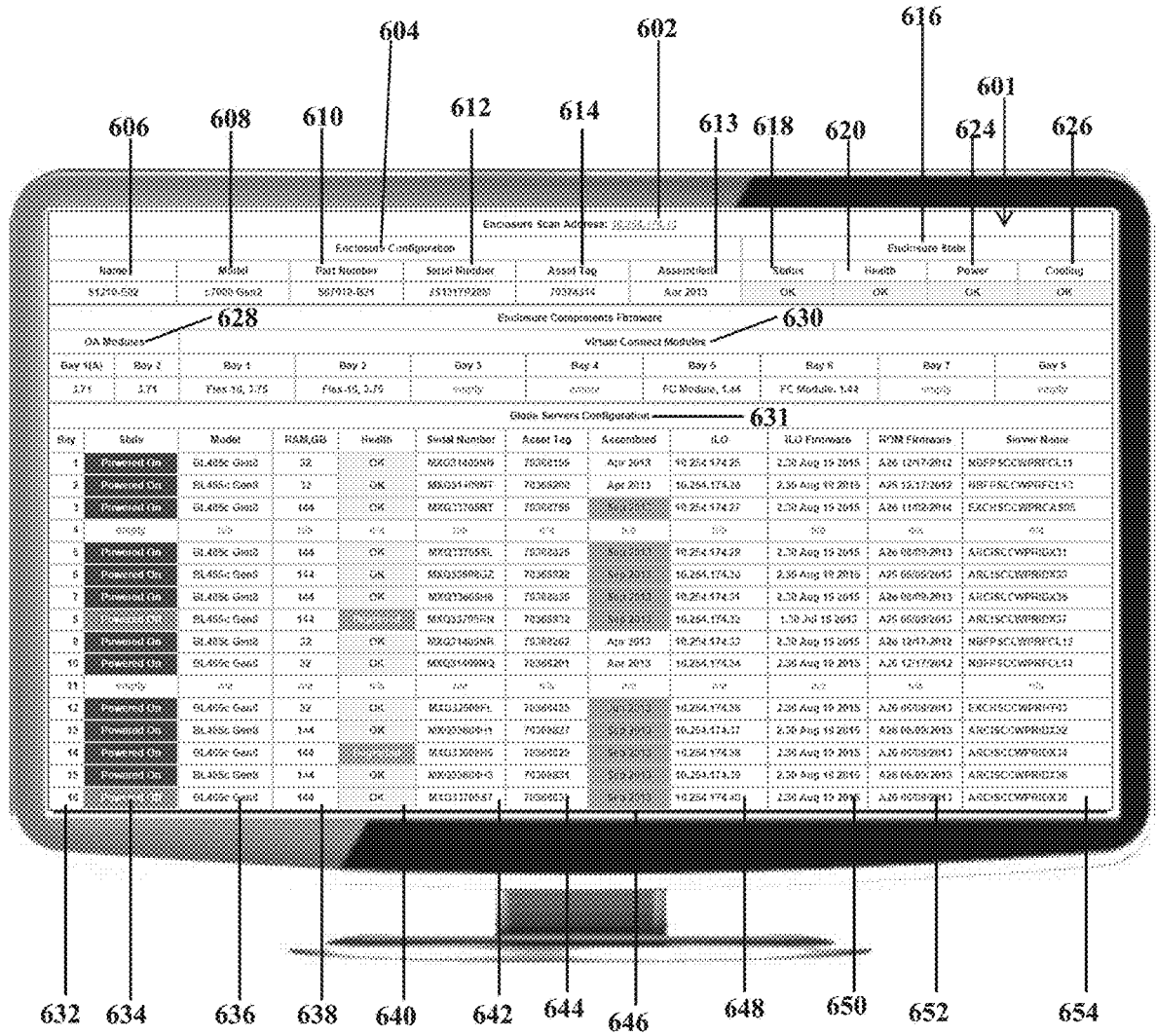
FIG. 6 shows an illustrative graphical user interface (GUI) showing an illustrative snapshot view of a network architecture.

FIG. 6 shows a graphical user interface (GUI) 600 with a second illustrative snapshot view 601 of network infrastructure. The snapshot view 601 may have been generated by a computer using the illustrative methods and illustrative principles described herein. The snapshot view 601 may display the statuses of and information about blade servers within server enclosure (also referred to as enclosure). For instance, the snapshot view 601 may display the scan address 602 of the enclosure. In some embodiments, the scan address 602 of the enclosure may be the internet protocol (IP) address of the enclosure. The snapshot view 601 may further display an enclosure configuration 604 pane containing name 606, model 608, part number 610, serial number 612, asset tag 614, and/or assembly date 613 of the enclosure. The snapshot display may further display an enclosure state pane 616 containing overall status 618, health status 620, power status 624, and/or cooling status 626. The snapshot view 601 may further include on-board administrator (OA) module information column 628 containing information such as a version number of a respective OA. The snapshot view 601 may also include a virtual connect modules information column 630 containing information such as the model number of the virtual connect modules.

The snapshot view 601 may include a blade servers configuration pane 631 containing information of a plurality of blade servers included within the enclosure described above. Within the blade servers configuration pane 502, the snapshot view 601 may display bay number column 632 showing a sequence number for a bay containing a respective blade server. The snapshot view 601 may further display a state column 632 showing the state of the respective blade server. As shown, the state may be "Powered On" for a blade server that is powered on, "Powered Off" for a blade server that is powered off and "Empty" for a bay that that does not contain a blade server. A model column 636 may show the model number of the respective blade server. A RAM column 638 may show the size of the random access memory (RAM) of the respective blade server. A health column 640 may show the health status of the blade server. Illustrative health statuses may include "OK" for a healthy blade server and "Degraded" for a blade server with degraded health status. A serial number column 642 may show the hardware serial number of the respective blade server. An asset tag column 644 may show the asset tag for the respective blade server. An assembled date column 646 may show the assembly date (currency information) of the respective blade server. A server management firmware version column 648 may show the version of the server management firmware of the respective blade server. A server management firm update date column 650 may show the update date of the server management firmware for the respective blade server. A read only memory (ROM) firmware column 652 may show the version name and the latest update date of the respective blade server. A server name column 654 may show the name of the respective blade server.

Figure 7:
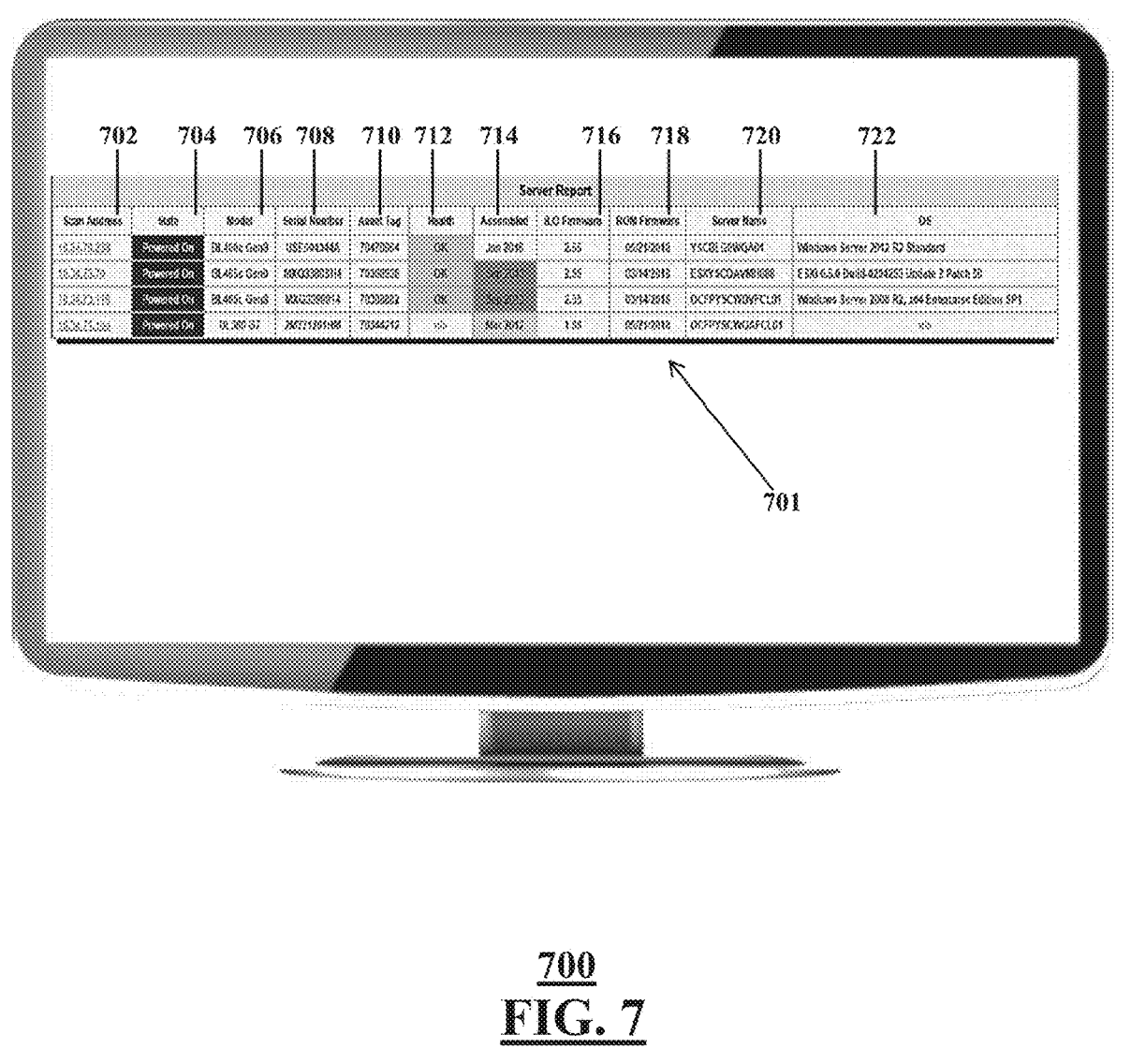

FIG. 7 shows a GUI 700 with an illustrative snapshot view 701 generated by a snapshot engine in a server processing mode. The snapshot engine may include one or more software modules being executed by a computer. The snapshot view 701 may show various hardware information, firmware information, and software information about various servers scanned by a snapshot engine. For example, the snapshot view 701 may include a scan address column 702 showing internet protocol (IP) addresses of a plurality of servers (4 servers, as shown). A state column 704 may show the operating state of the corresponding server. A server, for example, may be "Powered On," "Powered Off," or "Inaccessible." A model column 706 may show a models of the servers scanned by the snapshot engine. For instance, a server may have alphanumeric code as a shorthand for the configuration and its generation number. A serial number column 708 may show the serial numbers for the plurality of servers. An asset tag column 710 may show the asset tag of the servers. The asset tags may be provided by an entity/person that owns the network infrastructure containing the servers. A health column 712 may indicate the health status of the servers. For example, a server may have a health status of "OK," "Degraded," or "Not Available (n/a)." An assembled column 714 may show the assembly dates for the servers. An assembly date for a server may be referred to as currency information for the server. A server firmware column 716 may show the current versions of the corresponding firmware in the servers. A ROM firmware column 718 may show versions (or currency dates) of the corresponding ROM firmware in the servers. A server name column 720 may show the names of the servers. A name of the server may be provided by a manufacturer or the entity/person that owns the servers. An operating system (OS) column 722 may show the operating systems (e.g., Windows Server) installed in the servers.

Figure 8:
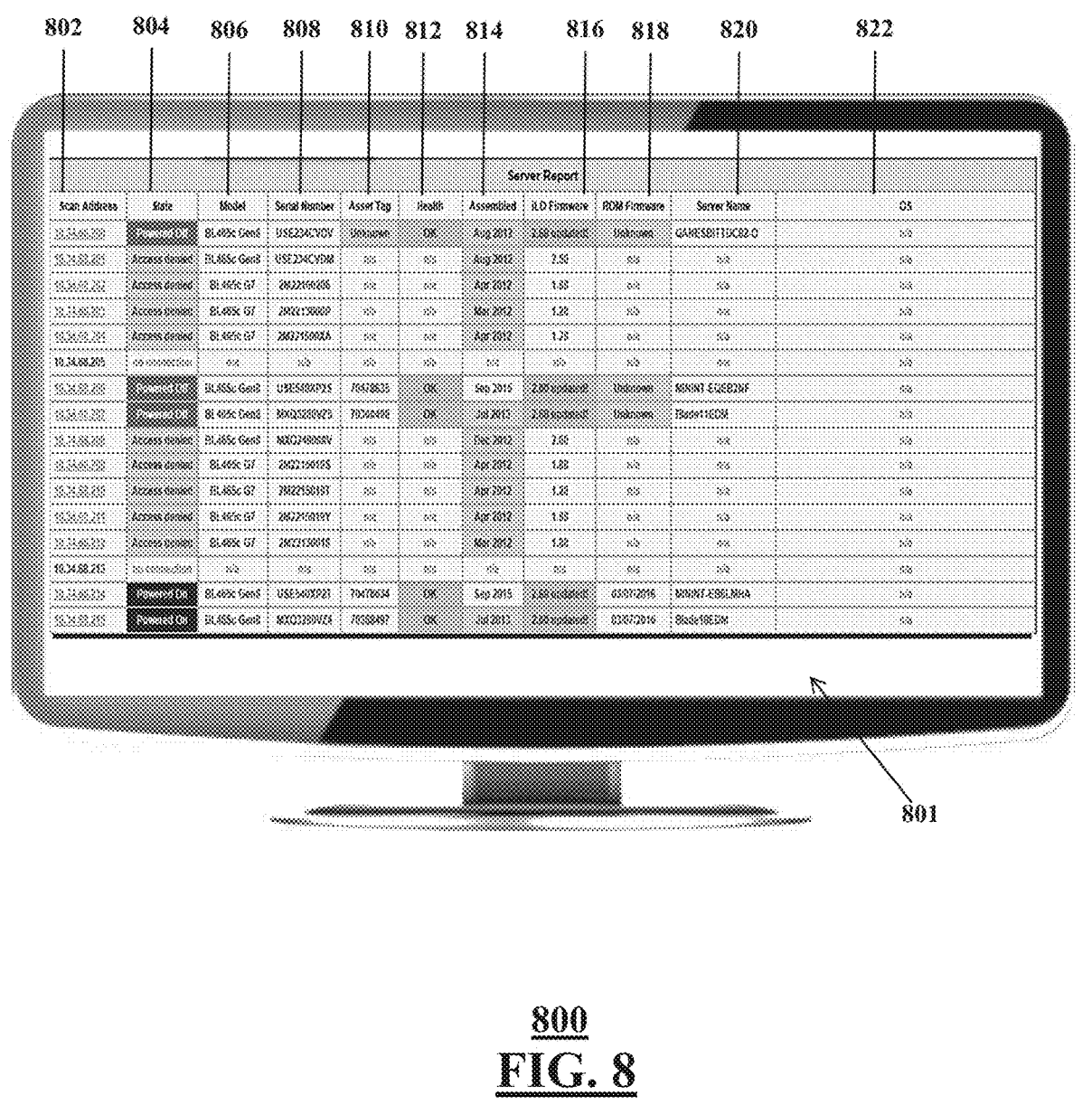

FIG. 8 shows a GUI 800 with an illustrative snapshot view 801 generated by a snapshot engine in a server processing and an active state mode. The snapshot engine may include one or more software modules being executed by a computer. In the server processing mode, the snapshot engine may scan multiple standalone servers (e.g., rack servers). In the active mode, the snapshot engine may push firmware binaries to the servers being scanned. The snapshot engine may retrieve the firmware binaries from local files stored within the computer that is executing the snapshot engine. Alternatively, the snapshot engine may retrieve the firmware binaries from remote files stored at remote locations. The snapshot engine may operate executing multi-threader operations to generate the snapshot view 801.

The snapshot view 801 may include tabular data with multiple columns showing hardware, firmware, and software information of the servers scanned by the snapshot engine. For example, a scan address column 802 may show the IP addresses of the servers scanned by the snapshot engine. A state column 804 may show the operating states of the servers scanned by the snapshot engine. An operating state may be (1) "Powered Off" for servers that are powered off, (2) "Powered On" for servers that are powered on, (3) "Access Denied" for the servers that the snapshot engine did not have access to, and (4) "No Connection" for the servers that the snapshot engine could not connect. A model column 806 may show the models of the servers. A serial number column 808 shows the serial numbers for the servers. An asset tag column 810 may show the asset tags for the servers. The asset tags may be assigned to the servers by the persons/entities that own the servers. An asset tag may be "Unknown" for a server that is powered off and may be "Not Available (n/a)" for a server that the snapshot engine could not access. A health column 812 may show the health statuses of the servers. For example, a server may have an "OK" health status indicating that there are no operational problems with the server. Fort the servers that the snapshot engine could not access, the health status may be "Not Available (n/a)." An assembly date column 814 may indicate the dates of assembly for the servers. A date of assembly for a server may be referred to as currency information about the server. A server firmware version column 816 may show the versions of the firmware corresponding to the servers. In addition to showing the current firmware version, the snapshot engine may also show upgrades to the firmware in the active mode of operation shown in FIG. 8. A ROM firmware column 818 may show the versions of the ROM firmware of the corresponding servers. A server name column 820 may show the name of the server. An operating system column 822 may show the operating systems of the servers.

Figure 9:
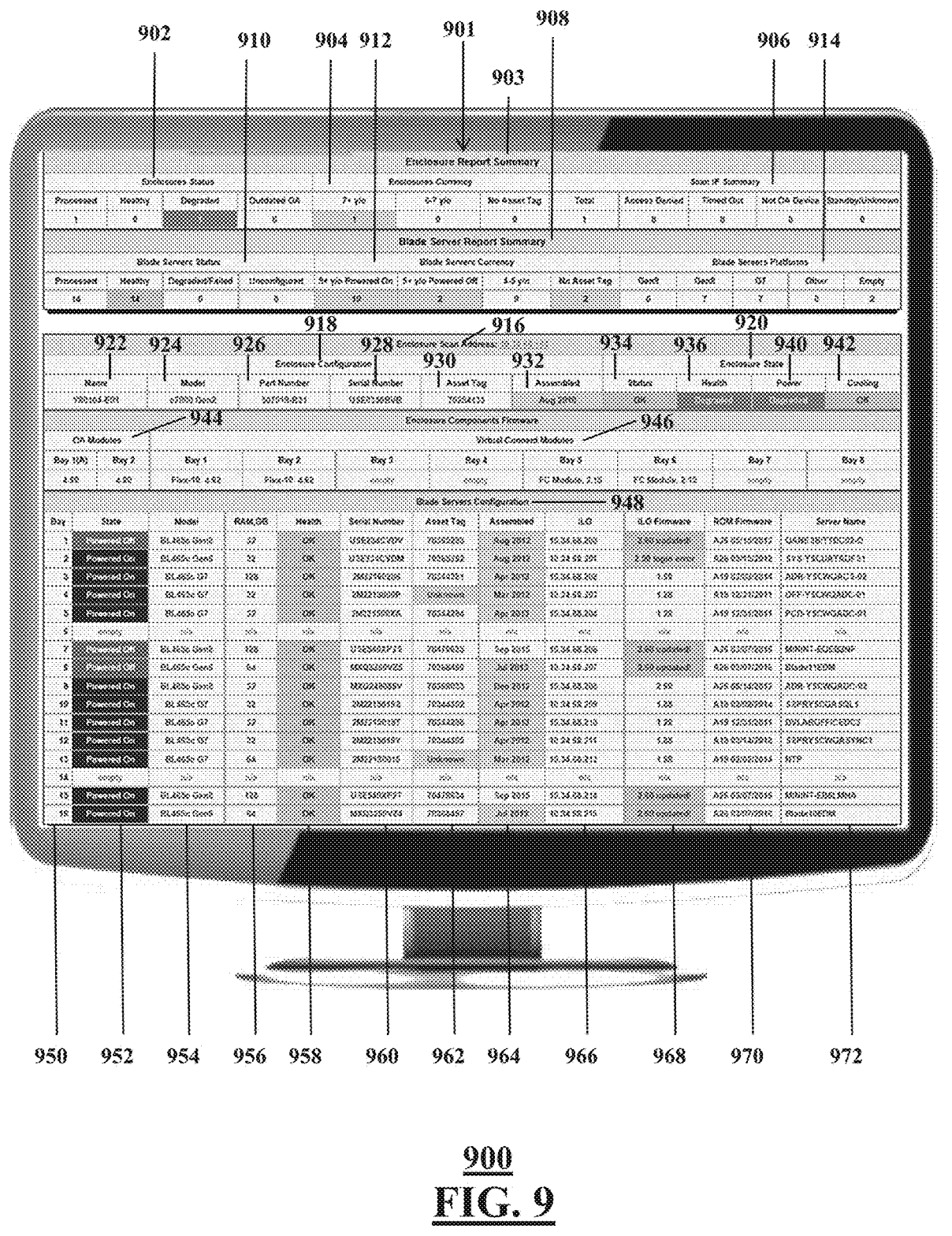

FIG. 9 shows a GUI 900 with an illustrative snapshot view 901 generated by a snapshot engine in a blade enclosure processing and an active state mode. The snapshot engine may include one or more software modules being executed by a computer. In a blade-enclosure processing mode, the snapshot engine may access an on-board administrator module of a blade enclosure to scan information about the blade servers from the on-board administrator module. In the active mode, the snapshot engine may push firmware binaries to the blade servers through the on-board administrator module. To push the firmware binaries, the snapshot engine may perform nested multi-threader operations.

The snapshot view 901 generated by the snapshot engine may show information about the hardware, software, firmware, and upgrades to the firmware by the snapshot engine. In an enclosure report summary 903, the snapshot view 901 may show an enclosure status column 904 displaying the number of the enclosures that were processed for snapshot view 901. The enclosures status column 904 may further display, out of the processed enclosures, the number of healthy enclosures, the number of degraded enclosures, and/or the number of outdated on-board administrators. The enclosure report summary 903 may further include an enclosures currency column 904 displaying the currency (age) of the enclosures. As an illustration, the enclosures currency column 904 may display the number of enclosures that are more than seven years old, the number of enclosures that are six to seven years old, and/or the number of enclosures with no asset tags. The enclosure report summary 903 may further include a Scan IP summary column 906 displaying the summary of the IP addresses that were scanned by the snapshot engine. For instance, the scan IP summary 906 may display the total number of IP addresses that were scanned, the number of IP addresses that denied access to the snapshot engine, the number of IP addresses for which one or more requests by the snapshot engine were timed out, the number of IP addresses that were not associated with the on-board administrator module, and/or the number of IP addresses associated with unknown destination or devices.

The snapshot view 901 may further display a blade server report summary 908. The blade server report summary 908 may display a blade servers status column 910 displaying the respective numbers of processed blade servers, healthy blade servers, degraded or failed blade servers, and/or unconfigured blade servers. The blade server report summary 908 may further display a blade servers currency column 912 displaying the currency statuses of the processed blade servers. As shown herein, the blade servers currency column 912 may include the respective numbers of powered on blade servers that are more than five years old, powered off blade servers that are more than five years old, blade servers that are four to five years old, and/or blade servers with no asset tag. The blade server report summary 908 may further include blade servers platforms column 914 displaying the respective numbers of blade servers associated with respective hardware platform. For example, a hardware platform may be the generation/version of the server hardware/software. The blade servers platform column 914 may further include the number of blade servers without platform information.

The snapshot view 901 may display the statuses of and information about blade servers within the enclosure. For instance, the snapshot view 901 may display the scan address 916 of the enclosure. In some embodiments, the scan address 916 of the enclosure may be the internet protocol (IP) address of the enclosure. The snapshot view 901 may further display an enclosure configuration 918 pane containing name 922, model 924, part number 926, serial number 928, asset tag 930, and/or assembly date 932 of the enclosure. The snapshot view 901 may further display an enclosure state pane 920 containing overall status 934, health status 936, power status 940, and/or cooling status 942. The snapshot view 901 may further include on-board administrator module information column 944 containing information such as a version number of a respective on-board administrator module. The snapshot view 901 may also include a virtual connect modules information column 946 containing information such as the model number of the virtual connect modules.

The snapshot view 901 may include a blade servers configuration pane 948 containing information of a plurality of blade servers included within the enclosure described above. Within the blade servers configuration pane 948, the snapshot view 901 may display bay number column 950 showing a sequence number for a bay containing a respective blade server. The snapshot view 901 may further display a state column 952 showing the state of the respective blade server. As shown, the state may be "Powered On" for a blade server that is powered on, "Powered Off" for a blade server that is powered off and "Empty" for a bay that does not contain a blade server. A model column 954 may show the model number of the respective blade server. A RAM column 956 may show the size of the random access memory (RAM) of the respective blade server. A health column 958 may show the health status of the blade server. Illustrative health statuses may include "OK" for a healthy blade server and "Degraded" for a blade server with degraded health status. A serial number column 960 may show the hardware serial number of the respective blade server. An asset tag column 962 may show the asset tag for the respective blade server. An assembled date column 964 may show the assembly date (currency information) of the respective blade server. A server management firmware version column 966 may show the version of the server management firmware of the respective blade server. A server management firm update date column 968 may show the update date of the server management firmware for the respective blade server. The updates may have been performed by the snapshot engine by executing nested multi-threader operations in an active state mode. A read only memory (ROM) firmware column 970 may show the version name and the latest update date of the respective blade server. A server name column 972 may show the name of the respective blade server.

The illustrative snapshot views 501, 601, 801, 901 may show uniform resource locators (URLs) for active on-board administrators (OAs) such that the user may open the respective web page from the snapshot views 501, 601, 801, 901. The snapshot views 501, 601, 801, 901 may further incorporate pseudo 3D features for a better user experience. In some embodiments, one or more snapshot view files generating the snapshot views 501, 601, 801, 901 may be in HTML5 format and configured to be displayed in web browsers such as Chrome, Internet Explorer, Firefox, Safari, and web browsers running in mobile devices.

The illustrative snapshot views 501, 601, 801, 901 may color code the display to indicate the health of the respective network resource. To indicate the health state of an enclosure, the snapshot views 501, 601, 801, 901 may display informational status, such as indicating that the enclosure is turned off, in a neutral color such as white or beige. The snapshot views 501, 601, 801, 901 may indicate that the enclosure has no issues in green, warnings in yellow, and critical condition in red. For the currency of server blades, the snapshot views 501, 601, 801, 901 may display informational status in beige, an alert status in pink, and a warning status in yellow. It should be understood that these color codes are merely illustrative, and other color codes may be used without deviating from the scope of this disclosure.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
during a first thread executed by a computer:
querying, by the computer, a first on-board administration module of a first server enclosure using a first internet protocol address of the first server enclosure to retrieve a first set of data records containing hardware and firmware information of a first set of blade servers in the first server enclosure; and
pushing, by the computer, a firmware upgrade binary for at least a subset of the first set of blade servers; and
during a second thread executed by the computer contemporaneously with the first thread:
querying, by the computer, a second on-board administration module of a second server enclosure using a second internet protocol address of the second server enclosure to retrieve a second set of data records containing hardware and firmware information of a second set of blade servers in the second server enclosure; and
pushing, by the computer, a firmware upgrade binary for at least a subset of the second set of blade servers.

2. The method of claim 1, wherein the first thread executed by the computer comprises a first parent thread and the second thread executed by the computer comprises a second parent thread, further comprising:
during the first parent thread executed by the computer:
spawning, by the computer, a first set of child threads corresponding to the first set of blade servers, wherein each child thread of the first set of child threads is nested within the first parent thread,
wherein the pushing the firmware upgrade binary for at least the subset of the first set of blade servers uses corresponding subset of child threads of the first set of child threads;
during the second parent thread executed by the computer contemporaneously with the first parent thread:
spawning, by the computer, a second set of child threads corresponding to the second set of blade servers, wherein each child thread of the second set of child threads is nested within the second parent thread,
wherein the pushing the firmware upgrade binary for at least the subset of the second set of blade servers uses corresponding subset of child threads of the second set of child threads.

3. The method of claim 2, wherein the firmware information of each of the first and second set of blade servers comprises an indication if the corresponding child thread pushed a firmware upgrade binary to a blade server.

4. The method of claim 1, further comprising
during a third thread executed by the computer contemporaneously with the first and second threads:
querying, by the computer, a third on-board administration module of a third server enclosure using a third internet protocol address of the third server enclosure to retrieve a third set of data records containing hardware and firmware information of a third set of blade servers in the second server enclosure; and
pushing, by the computer, a firmware upgrade binary for at least a subset of the third set of blade servers.

5. The method of claim 1, further comprising:
generating, by the computer, a hypertext markup language snapshot view file of a network infrastructure containing the first and second server enclosures based upon the first and second set of data records; and
transmitting, by the computer to a user device, an electronic communication containing a selectable link configured to retrieve the snapshot view file from the computer and cause the user device to generate the snapshot view using the snapshot view file, wherein the user device is configured to display the snapshot view on a web browser application.

6. The method of claim 1, wherein the computer only queries only the first and second on-board administrator modules during each of the first and second threads for hardware and firmware information.

7. The method of claim 1, further comprising:
authenticating, by the computer, the computer with the first server enclosure through a single sign-on (SSO) mechanism using a set encrypted username and encrypted password for the first on-board administrator module; and
authenticating, by the computer, the computer with the second server enclosure through the SSO mechanism using the set of encrypted username and encrypted password for the second on-board administrator module.

8. The method of claim 1, wherein the hardware information of each of the first set and the second set of blade servers comprises at least one of model number, size of random access memory, hardware serial number, asset tag, and assembly date.

9. The method of claim 1, wherein the firmware information of each of the first set and the second set of blade servers comprises at least one of server management firmware version, server management firmware update date, and read only memory firmware version and update date.

10. The method of claim 1, further comprising:
retrieving, by the computer, hardware information of the first server enclosure during the first thread; and
retrieving, by the computer, hardware information of the second server enclosure during the second thread.

11. A computer-implemented method comprising:
during a first thread executed by a computer:
querying, by the computer, a first on-board administration module of a first server enclosure using a first internet protocol address of the first server enclosure to retrieve a first set of data records containing hardware and firmware information of a first set of blade servers in the first server enclosure; and
pushing, by the computer, a firmware upgrade binary for at least a subset of the first set of blade servers;
during a second thread executed by the computer contemporaneously with the first thread:
querying, by the computer, a second on-board administration module of a second server enclosure using a second internet protocol address of the second server enclosure to retrieve a second set of data records containing hardware and firmware information of a second set of blade servers in the second server enclosure; and
pushing, by the computer, a firmware upgrade binary for at least a subset of the second set of blade servers; and
generating, by the computer, a hypertext markup language snapshot view file of a network infrastructure containing the first and second server enclosures based upon the first and second set of data records.

12. The method of claim 11, further comprising:
transmitting, by the computer to a user device, an electronic communication containing a selectable link configured to retrieve the snapshot view file from the computer and cause the user device to generate the snapshot view using the snapshot view file, wherein the user device is configured to display the snapshot view on a web browser application.

13. A system comprising:
a non-transitory storage medium storing a plurality of computer instructions forming a snapshot view engine;
a processor electrically coupled to the non-transitory storage medium and configured to execute the plurality of computer instructions to:
during a first thread executed by the processor:
query a first on-board administration module of a first server enclosure using a first internet protocol address of the first server enclosure to retrieve a first set of data records containing hardware and firmware information of a first set of blade servers in the first server enclosure; and
push a firmware upgrade binary for at least a subset of the first set of blade servers;
during a second thread executed by the processor contemporaneously with the first thread:
query a second on-board administration module of a second server enclosure using a second internet protocol address of the second server enclosure to retrieve a second set of data records containing hardware and firmware information of a second set of blade servers in the second server enclosure; and
push a firmware upgrade binary for at least a subset of the second set of blade servers.

14. The system of claim 13, wherein the first thread executed by the computer comprises a first parent thread and the second thread executed by the computer comprises a second parent thread, wherein the processor is further configured to execute the plurality of computer instructions to:
during the first parent thread executed by the computer:
spawn a first set of child threads corresponding to the first set of blade servers, wherein each child thread of the first set of child threads is nested within the first parent thread,
wherein push the firmware upgrade binary for at least the subset of the first set of blade servers uses corresponding subset of child threads of the first set of child threads;
during the second parent thread executed by the computer contemporaneously with the first parent thread:
spawn a second set of child threads corresponding to the second set of blade servers, wherein each child thread of the second set of child threads is nested within the second parent thread,
wherein push the firmware upgrade binary for at least the subset of the second set of blade servers uses corresponding subset of child threads of the second set of child threads.

15. The system of claim 14, wherein the firmware information of each of the first and second set of blade servers comprises an indication if the corresponding child thread pushed a firmware upgrade binary to a blade server.

16. The system of claim 13, wherein the processor is further configured to execute the plurality of computer instructions to:
during a third thread executed by the processor contemporaneously with the first and second threads:
query a third on-board administration module of a third server enclosure using a third internet protocol address of the third server enclosure to retrieve a third set of data records containing hardware and firmware information of a third set of blade servers in the second server enclosure; and
push a firmware upgrade binary for at least a subset of the third set of blade servers.

17. The system of claim 13, wherein the processor is further configured to execute the plurality of computer instructions to:

generate a hypertext markup language snapshot view file of a network infrastructure containing the first and second server enclosures based upon the first and second set of data records; and transmit to a user device, an electronic communication containing a selectable link configured to retrieve the snapshot view file from the computer and cause the user device to generate the snapshot view using the snapshot view file, wherein the user device is configured to display the snapshot view on a web browser application.

18. The system of claim 13, wherein the processor only queries only the first and second on-board administrator modules during each of the first and second parent threads for hardware and firmware information.

19. The system of claim 13, wherein the hardware information of each of the first set and second set of blade servers comprises at least one of model number, size of random access memory, hardware serial number, asset tag, and assembly date.

20. The system of claim 13, wherein the firmware information of each of the first set and second set of blade servers comprises at least one of server management firmware version, server management firmware update date, and read only memory firmware version and update date.

\* \* \* \* \*